US007878903B2

(12) United States Patent
Chan

(10) Patent No.: US 7,878,903 B2
(45) Date of Patent: Feb. 1, 2011

(54) METHOD AND GAMING MACHINE FOR SYMBOL ENHANCEMENT USING A SEMI-TRANSPARENT OVERLAY

(75) Inventor: Edward Chan, Willoughby (AU)

(73) Assignee: Konami Australia Pty Ltd, Botany, New South Wales (AU)

(*) Notice: Subject to any disclaimer, the term of this patent is extended or adjusted under 35 U.S.C. 154(b) by 1279 days.

(21) Appl. No.: 11/193,153

(22) Filed: Jul. 29, 2005

(65) Prior Publication Data

US 2007/0015565 A1 Jan. 18, 2007

(30) Foreign Application Priority Data

Jul. 12, 2005 (AU) .............................. 2005903699

(51) Int. Cl.
*G06F 17/00* (2006.01)
*G06F 19/00* (2006.01)

(52) U.S. Cl. ............................. 463/31; 463/16; 463/20; 463/29; 463/30; 463/32; 273/138.1

(58) Field of Classification Search ............. 463/16–20, 463/25, 29–33
See application file for complete search history.

(56) References Cited

U.S. PATENT DOCUMENTS

| | | | | |
|---|---|---|---|---|
| 4,448,419 | A | 5/1984 | Telnaes | |
| 5,152,529 | A | 10/1992 | Okada | |
| 5,395,111 | A | 3/1995 | Inoue | |
| 5,580,055 | A * | 12/1996 | Hagiwara | 273/143 R |
| 5,609,524 | A | 3/1997 | Inoue | |
| 5,611,535 | A | 3/1997 | Tiberio | |
| 5,624,119 | A | 4/1997 | Leake | |
| 5,722,891 | A | 3/1998 | Inoue | |
| 5,752,881 | A | 5/1998 | Inoue | |
| 5,807,172 | A | 9/1998 | Piechowiak | |
| 5,976,016 | A | 11/1999 | Moody et al. | |
| 5,984,781 | A | 11/1999 | Sunaga | |
| 6,007,066 | A | 12/1999 | Moody | |
| 6,056,642 | A * | 5/2000 | Bennett | 463/20 |
| 6,159,096 | A | 12/2000 | Yoseloff | |
| 6,227,971 | B1 | 5/2001 | Weiss | |
| 6,241,607 | B1 | 6/2001 | Payne et al. | |
| 6,309,299 | B1 | 10/2001 | Weiss | |
| 6,319,124 | B1 | 11/2001 | Baerlocher et al. | |

(Continued)

FOREIGN PATENT DOCUMENTS

| | | |
|---|---|---|
| AU | 768153 | 1/2002 |

(Continued)

OTHER PUBLICATIONS

Office Action of Dec. 13, 2007 for U.S. Appl. No. 11/281,258.

(Continued)

*Primary Examiner*—David L Lewis
*Assistant Examiner*—Milap Shah
(74) *Attorney, Agent, or Firm*—Knobbe Martens Olson & Bear LLP

(57) ABSTRACT

A gaming device and a method displaying symbols on a gaming device. The gaming device displays a plurality of reels of spinning symbols. Selected ones of the spinning symbols are highlighted or otherwise enhanced when shown in the display to the person playing the gaming device.

16 Claims, 7 Drawing Sheets

U.S. PATENT DOCUMENTS

| | | | | |
|---|---|---|---|---|
| 6,394,902 | B1 | 5/2002 | Glavich et al. | |
| 6,439,993 | B1 | 8/2002 | O'Halloran | |
| 6,464,581 | B1 | 10/2002 | Yoseloff et al. | |
| 6,517,432 | B1 * | 2/2003 | Jaffe | 463/16 |
| 6,517,433 | B2 * | 2/2003 | Loose et al. | 463/20 |
| 6,544,120 | B2 | 4/2003 | Ainsworth | |
| 6,604,999 | B2 | 8/2003 | Ainsworth | |
| 6,644,664 | B2 | 11/2003 | Muir et al. | |
| 6,663,487 | B1 | 12/2003 | Ladner | |
| 6,726,204 | B2 | 4/2004 | Inoue | |
| 6,805,349 | B2 | 10/2004 | Baerlocher et al. | |
| 6,869,357 | B2 | 3/2005 | Adams et al. | |
| 6,880,826 | B2 | 4/2005 | Inoue | |
| 6,893,018 | B2 | 5/2005 | Inoue | |
| 6,896,615 | B2 | 5/2005 | Berman | |
| 6,905,408 | B2 | 6/2005 | Inoue | |
| 6,908,381 | B2 | 6/2005 | Ellis | |
| 6,910,962 | B2 | 6/2005 | Marks et al. | |
| 6,932,700 | B2 | 8/2005 | Bennett et al. | |
| 6,960,134 | B2 | 11/2005 | Hartl et al. | |
| 7,056,213 | B2 | 6/2006 | Ching et al. | |
| 7,214,132 | B2 | 5/2007 | Inoue | |
| 7,237,775 | B2 * | 7/2007 | Thomas et al. | 273/143 R |
| 7,311,602 | B2 | 12/2007 | Inoue | |
| 7,316,395 | B1 * | 1/2008 | Kromydas | 273/143 R |
| 7,479,061 | B2 | 1/2009 | Okada | |
| 7,690,984 | B2 | 4/2010 | Tran et al. | |
| 2002/0039920 | A1 | 4/2002 | Bryant | |
| 2002/0123378 | A1 * | 9/2002 | Bucknall et al. | 463/16 |
| 2003/0013517 | A1 * | 1/2003 | Bennett et al. | 463/25 |
| 2003/0027611 | A1 | 2/2003 | Recard | |
| 2003/0087687 | A1 * | 5/2003 | Locke et al. | 463/20 |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0048646 | A1 * | 3/2004 | Visocnik | 463/16 |
| 2004/0053679 | A1 | 3/2004 | Getz et al. | |
| 2004/0058727 | A1 | 3/2004 | Marks et al. | |
| 2004/0063488 | A1 | 4/2004 | Berman | |
| 2004/0116175 | A1 | 6/2004 | Aida | |
| 2004/0198486 | A1 | 10/2004 | Walker et al. | |
| 2004/0219969 | A1 * | 11/2004 | Casey et al. | 463/20 |
| 2004/0266520 | A1 | 12/2004 | Aida | |
| 2005/0043083 | A1 | 2/2005 | Inoue | |
| 2005/0043084 | A1 | 2/2005 | Inoue | |
| 2005/0159208 | A1 | 7/2005 | Pacey | |
| 2005/0277460 | A1 | 12/2005 | Inoue | |
| 2006/0046830 | A1 | 3/2006 | Webb | |
| 2006/0052155 | A1 | 3/2006 | Inoue | |
| 2006/0084492 | A1 | 4/2006 | Baerlocher et al. | |
| 2006/0084498 | A1 | 4/2006 | Baerlocher et al. | |
| 2006/0166731 | A1 | 7/2006 | Yoshimi et al. | |
| 2006/0183533 | A1 | 8/2006 | Tran et al. | |
| 2006/0183534 | A1 | 8/2006 | Yoshimi | |
| 2006/0247002 | A1 | 11/2006 | Yoshimi et al. | |
| 2006/0287060 | A1 | 12/2006 | Yoshimi | |
| 2007/0270203 | A1 | 11/2007 | Aida | |
| 2008/0045300 | A1 | 2/2008 | Quayle et al. | |
| 2008/0045323 | A1 | 2/2008 | Berman | |

FOREIGN PATENT DOCUMENTS

| | | |
|---|---|---|
| AU | 2002301067 | 6/2003 |
| AU | 2004203045 | 7/2004 |
| JP | 6-246043 | 9/1994 |
| JP | 2002-325881 | 11/2002 |
| JP | 2003-236055 | 8/2003 |

OTHER PUBLICATIONS

Response to Office Action of Dec. 13, 2007 for U.S. Appl. No. 11/281,258 dated Mar. 13, 2008.

International Search Report on Patentability for PCT Application No. PCT/AU2004/001767.

Office Action of Jan. 28, 2008 for U.S. Appl No. 11/413,707.

U.S. Appl. No. 11/413,707, filed Apr. 28, 2006, Yoshimi, 2006/0287060, Office Action dated Jan. 28, 2008 Response to Office Action of Jan. 28, 2008 filed Jul. 28, 2008.

U.S. Appl. No. 11/281,258, filed Nov. 17, 2005, Tran, 2006/0183533, Office Action of Dec. 13, 2007 Response to Office Action of Dec. 13, 2007 filed Mar. 13, 2008 Office Action dated Jun. 24, 2008.

U.S. Appl. No. 10/583,210, filed Mar. 26, 2007, Quayle, 2008/0045300, Office Action dated Aug. 7, 2008.

U.S. Appl. No. 11/299,009, filed Dec. 9, 2005, Yoshimi, 2006/0183534, Feb. 20, 2009—Office Action.

U.S. Appl. No. 11/413,707, filed Apr. 28, 2006, Yoshimi, 2006/0287060, Jan. 28, 2008-Office Action Jul. 28, 2008-Response to Office Action Dec. 2, 2008-Office Action Jun. 2, 2009-Response to Office Action.

U.S. Appl. No. 11/281,258, filed Nov. 17, 2005, Tran, 2006/0183533, Dec. 13, 2007-Office Action Mar. 13, 2008-Response to Office Action Jun. 24, 2008-Office Action Nov. 24, 2008-Response to Office Action Feb. 6, 2009-Final OA dated.

U.S. Appl. No. 10/583,210, filed Mar. 26, 2007, Quayle, 2008/0045300, Aug. 8, 2008-Office Action Dec. 8, 2008-Response to Office Action Apr. 16, 2009-Final Office Action dated.

* cited by examiner

METHOD AND GAMING MACHINE FOR SYMBOL ENHANCEMENT USING A SEMI-TRANSPARENT OVERLAY

CROSS-REFERENCE TO RELATED APPLICATIONS

This application claims the benefit of Australian Provisional Patent Application No. 2005903699 filed 12 Jul. 2005, which is hereby incorporated in its entirety herein.

BACKGROUND OF THE INVENTION

1. Field of the Invention

The invention relates to gaming machines for the playing of games of chance and, more particularly, to special features of elements of the display of such machines.

2. Description of the Related Art

Gaming, or poker machines, have become a major source of amusement and diversion in such places as clubs, hotels and casinos in many parts of the world.

Traditionally such machines were mechanical devices where a number of reels marked with a plurality of numbers or symbols could be made to spin randomly by the application of some mechanical input. If the subsequent patterns of numbers or symbols displayed on the reels, when these returned to a rest state, corresponded to predetermined patterns, the machine would provide a prize or payout. Generally such gaming machines have come to be regulated by government authorities as to their number and in the manner in which the machines must return a percentage of the monetary turnover to the players.

The introduction of electronics, computers and electronic graphical displays, has allowed a continual increase in the complexity and variations of gaming machines, games and displays while maintaining the basic concept of the traditional machine.

Machines and games that offer novel and stimulating variations on the basic game theme and environment are eagerly sought by the gaming industry and there is consequently intense competition between machine manufacturers to innovate.

Nevertheless the repetitive playing of even modern gaming machines can lead to boredom of the players with a consequent under-utilization of machines and increase in player dissatisfaction.

It is an object of the present invention to address or at least ameliorate some of the above disadvantages.

SUMMARY OF THE INVENTION

Accordingly, in a first broad form of the invention, there is provided a method for the enhancement of video imagery of selected symbols during spinning of simulated reels of an electronic gaming machine; said method including the steps of:

(a) selecting for enhancement a subset of symbols displayed on said reels, (b) associating a symbol enhancement feature comprising a virtual overlay with each of said subset of symbols during transit of said symbols through said display.

Preferably, visual effect of said virtual overlay is proportional to rotational velocity of said spinning of said reels; said effect a maximum at maximum reel spin velocity; said effect disappearing as said reels come to rest at a conclusion of a game sequence.

Preferably, said symbol enhancement feature comprises a semi-transparent region of a contrasting character.

Preferably, said region is centred on each of said selected symbols and extends partially over at least one adjoining symbol.

Preferably, said contrasting character is based on colour.

Preferably, said contrasting character is based on a random cycling of selected colours.

Preferably, said contrasting character is based on luminosity.

Preferably, said contrasting character is based on fluctuations of said luminosity.

Preferably, said region is of a comet-like shape; said region defining a head portion and a trailing tail portion.

Preferably, said head portion is centred on each of said selected symbols; said trailing tail portion extending substantially over at least a next following symbol of each of said selected symbols.

Preferably, said contrasting character of said head portion and said trailing tail portion is substantially identical.

Preferably, said contrasting character of said head portion and said trailing tail portion is different.

Preferably, said contrasting character of said head portion provides visually stronger enhancement than said trailing tail portion.

In a further broad form of the invention, there is provided a gaming machine for the playing of games of chance; said gaming machine comprising at least one display unit in which simulated reels are caused to spin and wherein selected symbols on said reels are provided with a semi-transparent symbol enhancement feature during spinning of said reels.

Preferably, said gaming machine includes a primary and a secondary display unit.

Preferably, said gaming machine is one of an array of gaming machines interconnected with to a jackpot system.

Preferably, said gaming machine is part of a local area network of interlinked machines.

In yet a further broad form of the invention there is provided a symbol enhancement feature comprising a virtual overlay for association with selected symbols on reels of an electronic gaming machine; said symbol enhancement feature synchronously spinning with spinning reels of said gaming machine.

In yet a further broad form of the invention there is provided a method of implementing said symbol enhancement feature of any of the previous broad forms implemented on a gaming machine; said method including the steps of:

(a) providing said gaming machine with a control module; said module including a microprocessor, a working memory and a data storage device connection means, (b) writing program code to said data storage device, (c) connecting said data storage device to said control module.

In still a further broad form of the invention there is provided media for storing enabling digital code for playing games; said media comprising solid state data retaining devices including, read only memory (ROM) and erasable programmable read only memory (EPROM), compact flash cards and PCMCIA cards; said media further including disc-based storage devices.

BRIEF DESCRIPTION OF THE DRAWINGS

Embodiments of the invention will now be described with reference to the accompanying drawings wherein.

DETAILED DESCRIPTION OF THE PREFERRED EMBODIMENT

Figure 1:
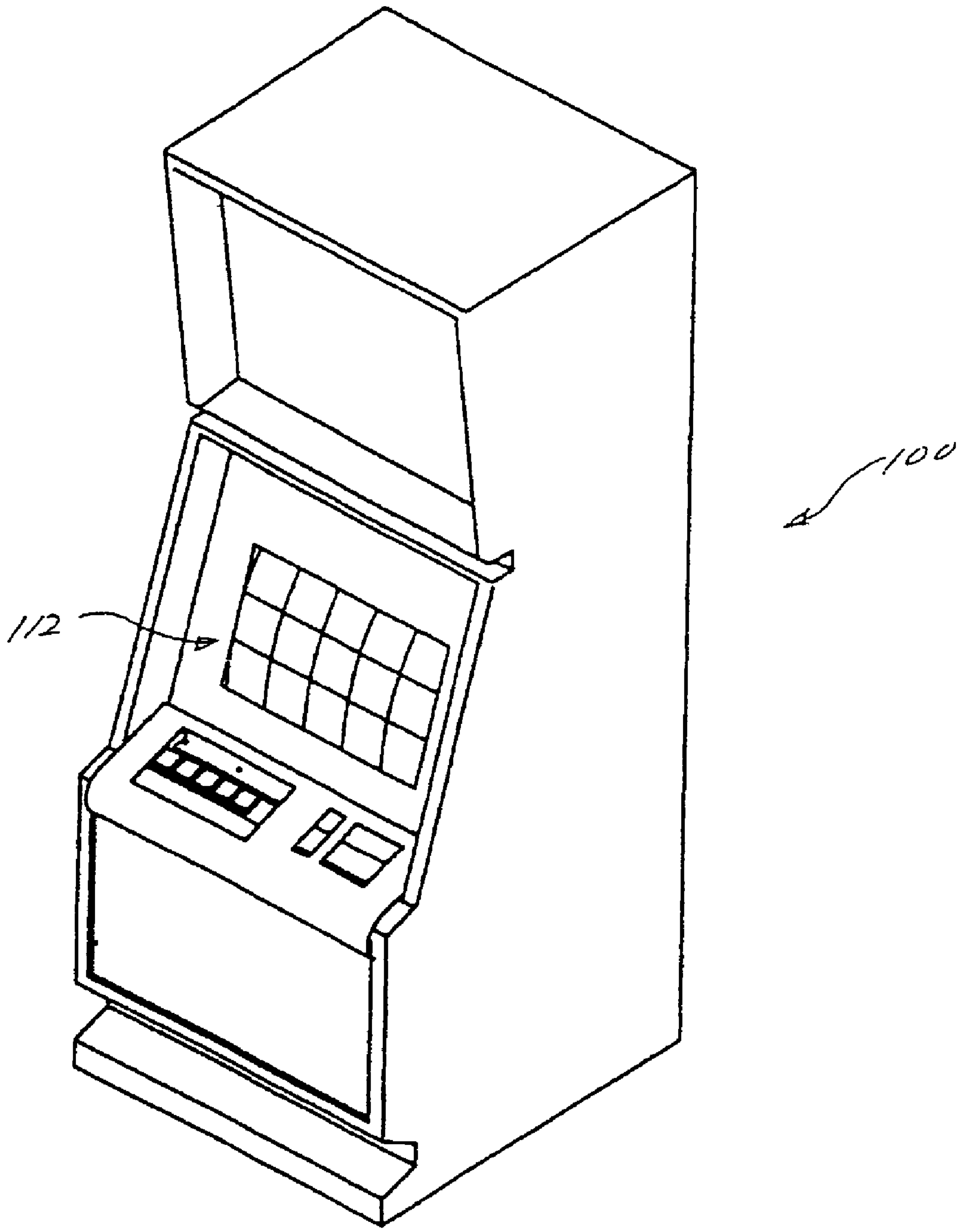
FIG. 1 is a perspective view of an electronic gaming machine with a single display unit.
Figure 2:
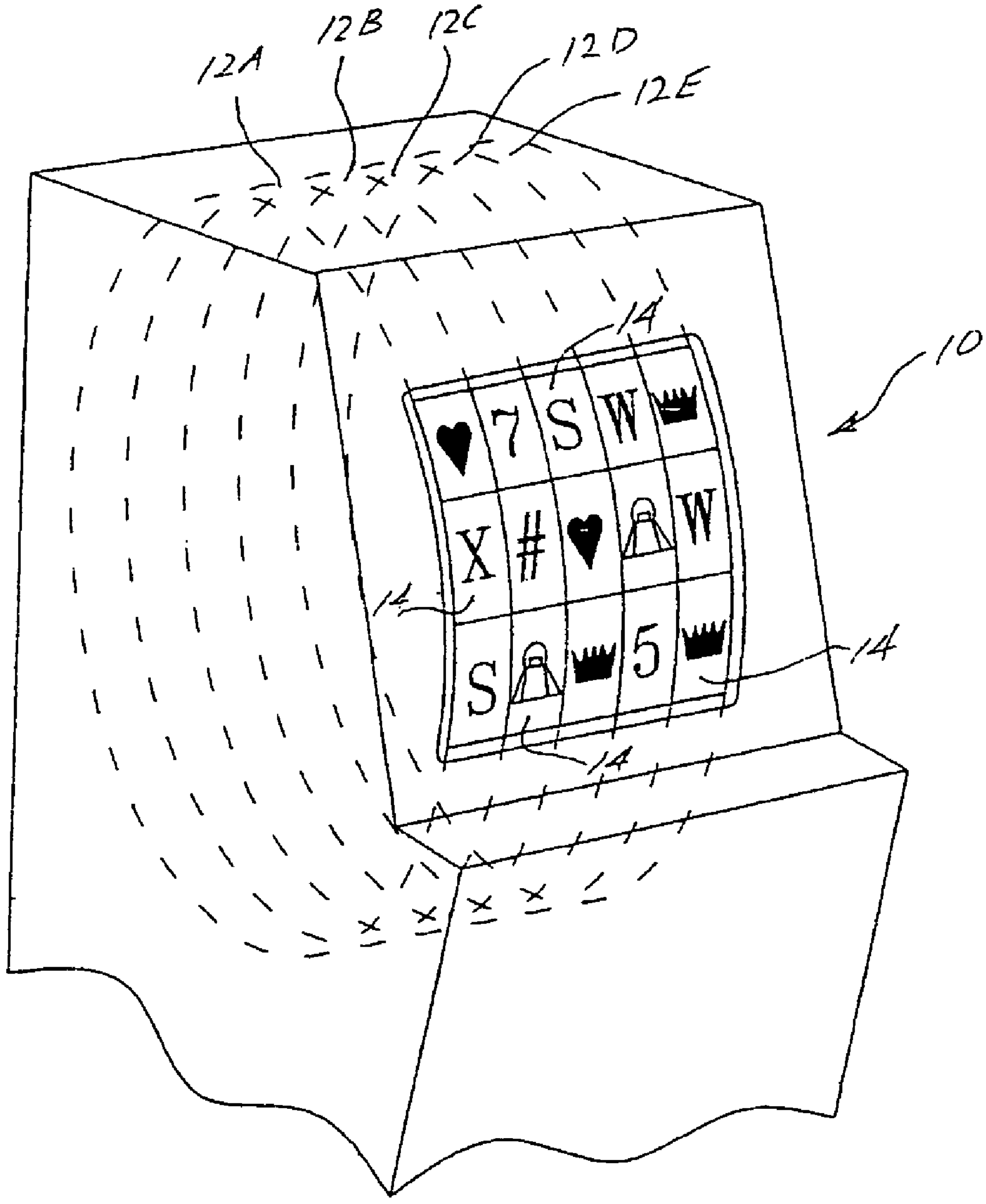
FIG. 2 is a representation of the display unit of FIG. 1 showing the matrix of symbol containing elements of formed by simulated or virtual reels.

Conventionally, electronic gaming machines or poker machines such as shown in FIG. 1 have continued to simulate in some form the spinning reels of their mechanical antecedents. Thus the video display unit (or the main display unit of a dual display machine), typically shows the progress and final outcome of a game played on the machine, implemented as segmented reels spinning about a notional horizontal axis, coming to rest as a matrix of elements in columns and rows as shown in FIG. 2. Some arrangement of predefined symbols displayed in selected ones of the displayed segments may then constitute a pay line or pattern.

The video images displayed on electronic gaming machines are computer generated on some form of electronic display such as CRTs, plasma and liquid crystal displays for example, and may be described as virtual images.

An important factor in the attraction of gaming machines of this type, is the anticipation by the player of a possible winning outcome as he or she watches the spinning reels and their symbols through the sequence of initial rapid spin, through gradual slowing, to coming to rest. A common feature of these games is that a selected sub-set of symbols may confer some additional prize or a bonus feature game, should some of the symbols of this sub-set form a winning pattern of symbols displayed at the final outcome of a game sequence.

The likely disposition of selected symbols to form a winning pattern as suggested by their appearance as the reels spin and slow towards stopping, is of particular interest to the player. The method of the present invention seeks to heighten the anticipation of a player during reel spin by enhancing the visibility of, or drawing attention to, such symbols as they traverse the display.

Figure 3:
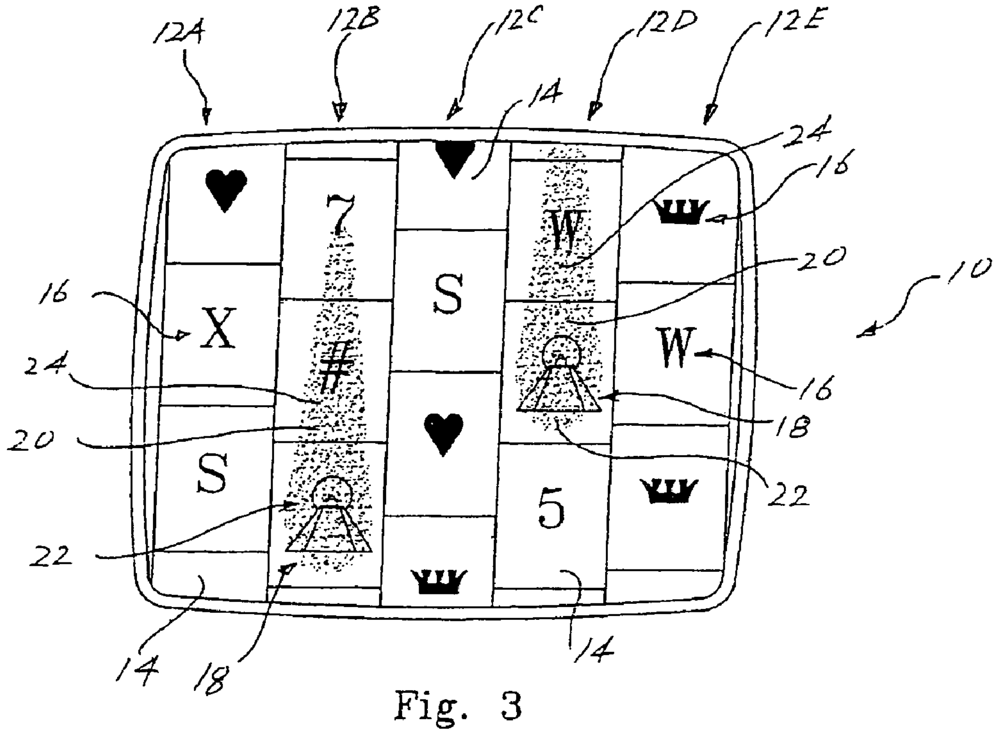
FIG. 3 is a representation of the display unit of FIGS. 1 and 2 during spinning of the virtual reels in a game sequence with virtual enhancement of selected symbols.

With reference to FIG. 2, a display unit 10 shows an array of, in this example, five spinnable reels 12A to 12E. Reels 12A to 12E are arranged side by side and are simulated to spin about a notional common horizontal axis. Each reel is divided into a number of elements 14 containing symbols 16, thus forming a five column by three row matrix when the reels are at rest as in FIG. 2. As the reels spin, at least the symbols 16 of three elements 14 of each reel are visible in the display 12 at any given instant, as shown in FIG. 3.

For a game sequence according to the present invention, a subset of symbols is selected for enhancement. These symbols may be any subset of the symbols displayed on the reels but will preferably be ones on which some outcome favourable to the player depends. For example, each, or a selection of the reels, may include a special symbol 18, for example a "wild" or "scatter" symbol, which potentially confers some additional benefit to the player. As the reels spin (from top to bottom of the display) and special symbols 18 transit through the display, each is overlaid with an enhancing virtual overlay, comprising a synchronously spinning semi-transparent region 20 (indicated by shading in FIG. 2). Region 20 has some contrasting character to distinguish it from the general appearance of the spinning reels 12A to 12B, and thus draws the player's attention to the symbol 18 visible beneath it.

The nature of the contrasting character may take the form of increased luminosity so that the region 20 appears to a viewer as a relatively bright translucent white mist through which the selected symbol 18 is still easily recognizable. Alternatively, the region 20 may consist of a patch of translucent contrasting colour.

In a least one preferred form, region 20 extends beyond the element 14 of the reel containing the selected symbol 18 and, in a particularly preferred form, consists of a comet-like shape comprising a head portion 22 and a tail portion 24. The head portion 22 in this preferred embodiment is then approximately centred on the selected symbol 18 with the trailing tail portion 24 extending at least over part of the element containing the next following symbol.

As a means of further enhancing the selected symbols, the luminescence of the region 20 may fluctuate or flare as the symbol passes through the display. Where the contrasting character is that of colour, the colour may sequence through a selection of colours for each passage of the symbol through the display.

Figure 4:
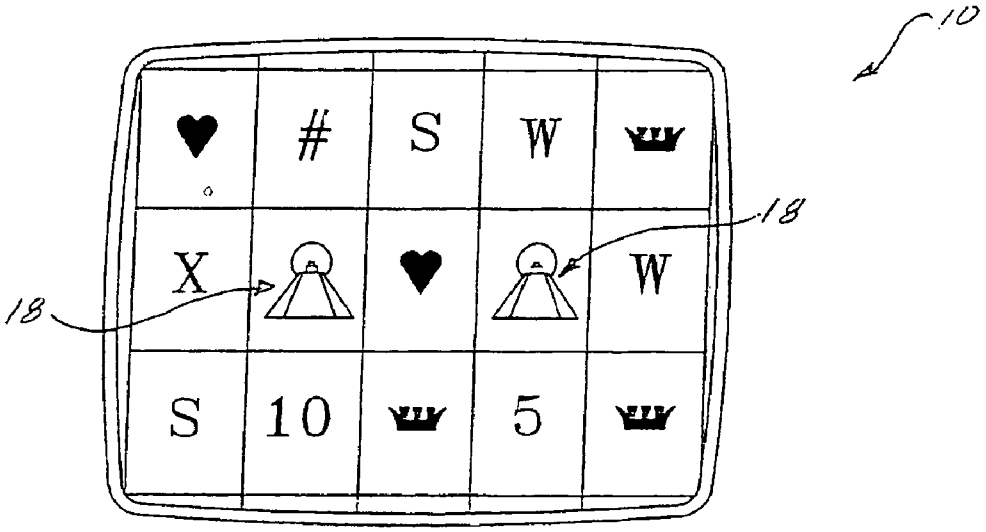
FIG. 4 is a representation of the display unit of FIG. 3 after the reels have come to rest.

The extent and intensity of the enhancing virtual overlay is proportional to the velocity of the spin of the reels. Thus the extent of the region, its luminosity or colour, are at a maximum when reel spin is maximum. As the reels begin to slow towards the end of the spinning phase of the game, the enhancing effect is gradually reduced and by the time the reels have come to rest, has disappeared completely as indicated in FIG. 4. The reduction of the effect may take the form of a gradual reduction of the length of the tail portion 24 and a lessening of the intensity of luminosity or colour.

Figure 5:
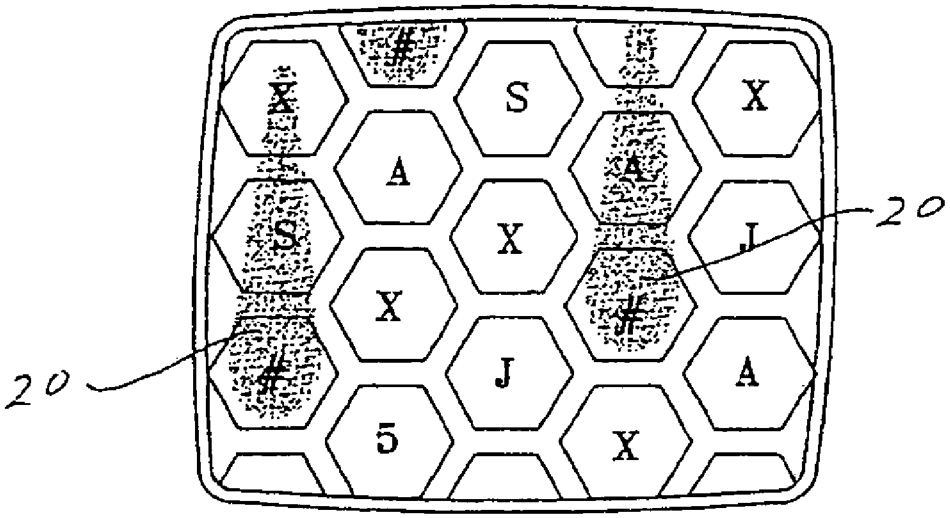
FIG. 5 is a representation of a display of N-sided elements with enhancement of selected symbols.
Figure 6:
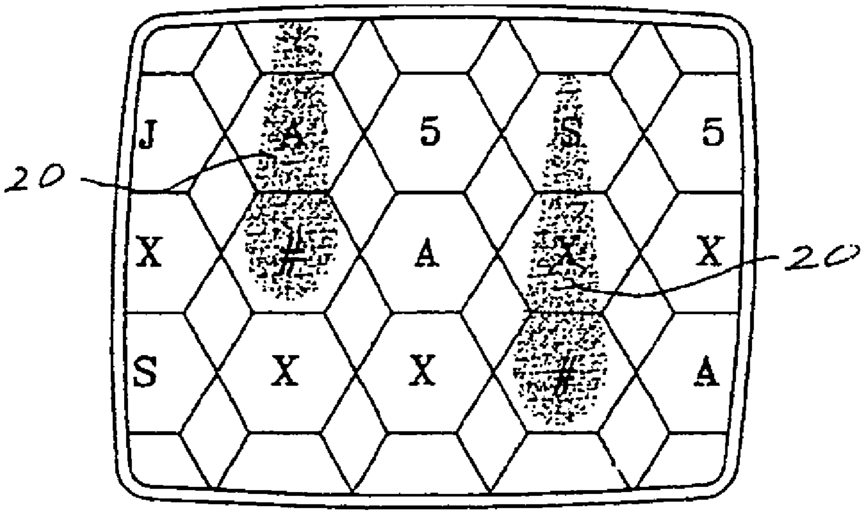
FIG. 6 is a representation of a further display of symbols in N-sided elements.

The enhancement region 20 may be applied to symbol containing elements of a display other than those forming a strictly rectangular element matrix at the end of a game sequence. Thus, although the game sequence may still simulate spinning reels, the elements of those reels may be bounded by n sides where n takes values other than 4. Thus for example FIGS. 5 and 6 show displays in which n-sided symbol containing elements with n=6 are employed. Again, selected symbols within those elements are enhanced by a distinctive region 20.

Game Implementation

Figure 9:
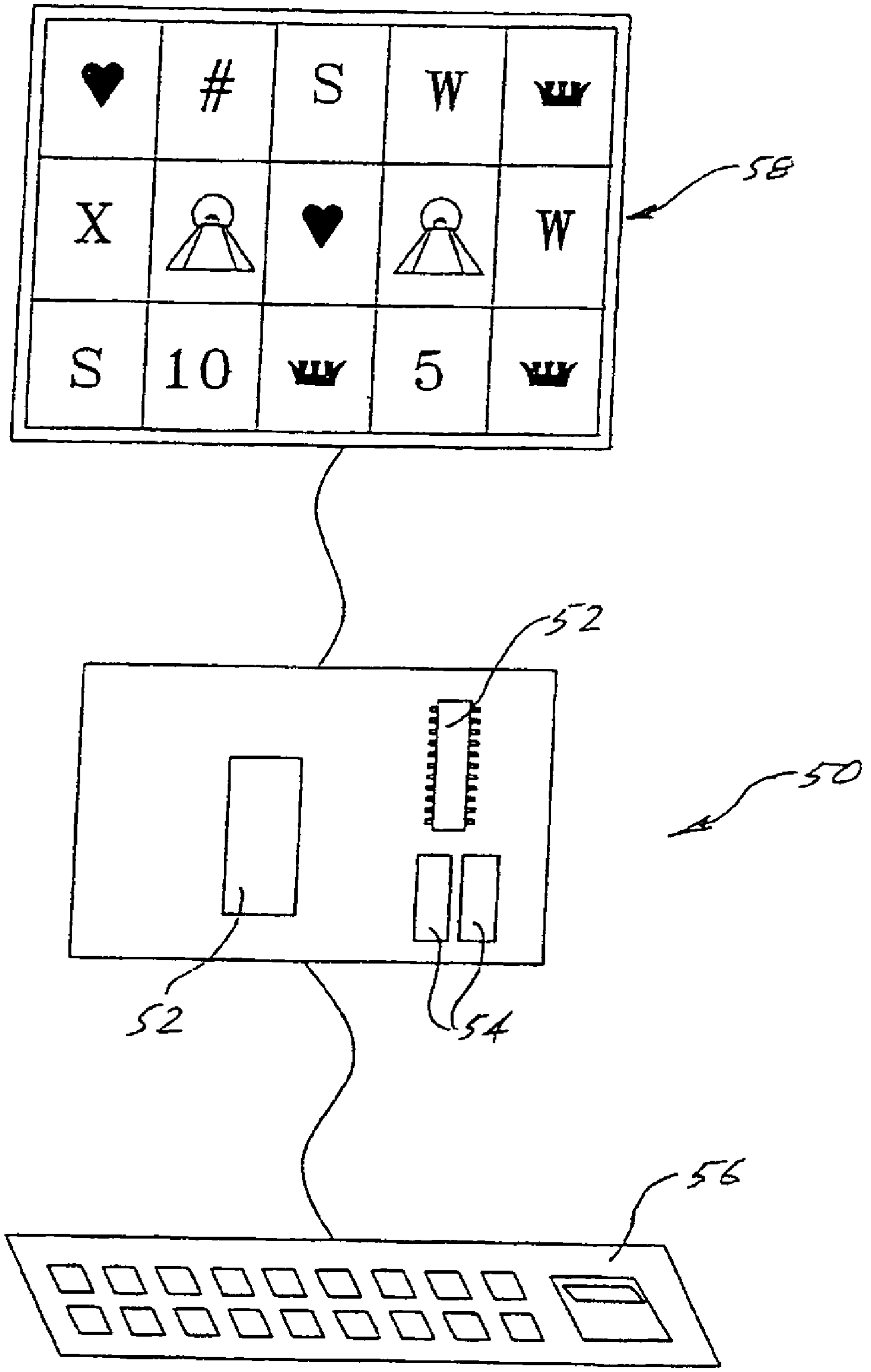
FIG. 9 illustrates a hardware implementation of embodiments of the present invention.

As shown in FIG. 9, a control module 50 is provided with a microprocessor 52 and working random access memory (RAM) 54. The program code driving any of the forms of symbol enhancement described above, may be introduced into the control module 50 by connection of a data storage device. The device may take any of a number of forms, such as read only memory (ROM), erasable read only memory (EPROM), Compact Flash Card, PCMCIA card and the like. Alternatively, control module 50 may incorporate a hard disc drive to which the code may be written via a suitable input device.

Control module 50 acts to implement appropriate elements of the program code according to inputs from a user keyboard 56 and outputs video imagery to at least a main display module 58.

Examples of Gaming Machine Implementation

The symbol enhancement feature of the present invention may be applied to both primary games played on the gaming machine and any bonus or feature games which may be offered as an outcome of the primary game.

1. Stand-Alone Gaming Machines

As shown in FIG. 1, the symbol enhancement feature described above may be implemented on a stand-alone gaming machine 100 provided with a single display unit 112.

2. Stand-Alone Gaming Machines with Secondary Display Unit

Figure 7:
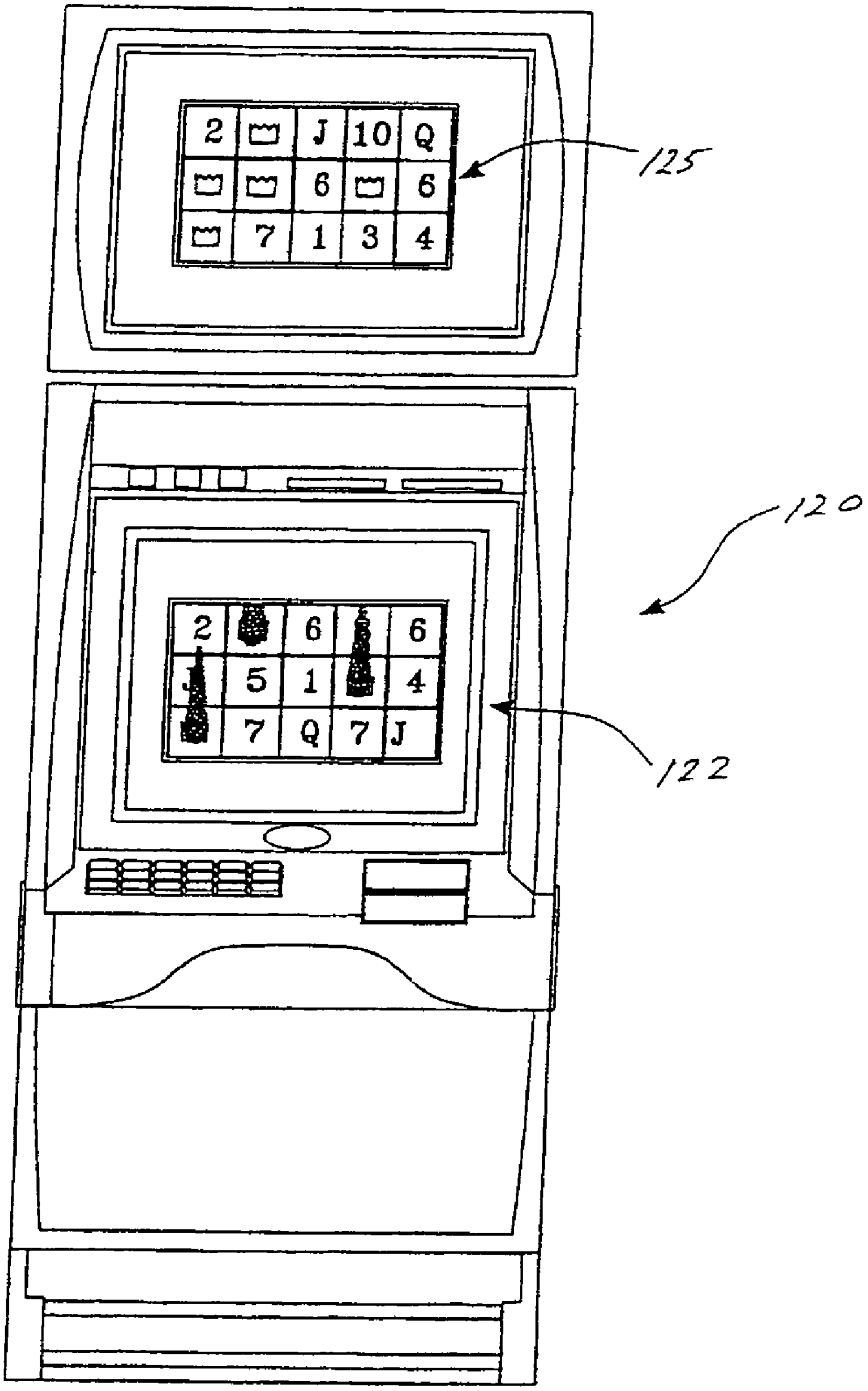
FIG. 7 illustrates a gaming machine wherein a further embodiment of the invention is applied to a dual monitor arrangement.

In a further preferred embodiment of the invention as shown in FIG. 7, a stand-alone gaming machine 120 is provided with a secondary display unit 125 as well as a main display unit 122. In this embodiment the symbol enhancement feature may be implemented on either or both of the display units.

3. Gaming Machines Linked to Progressive Jackpot System

Figure 8:
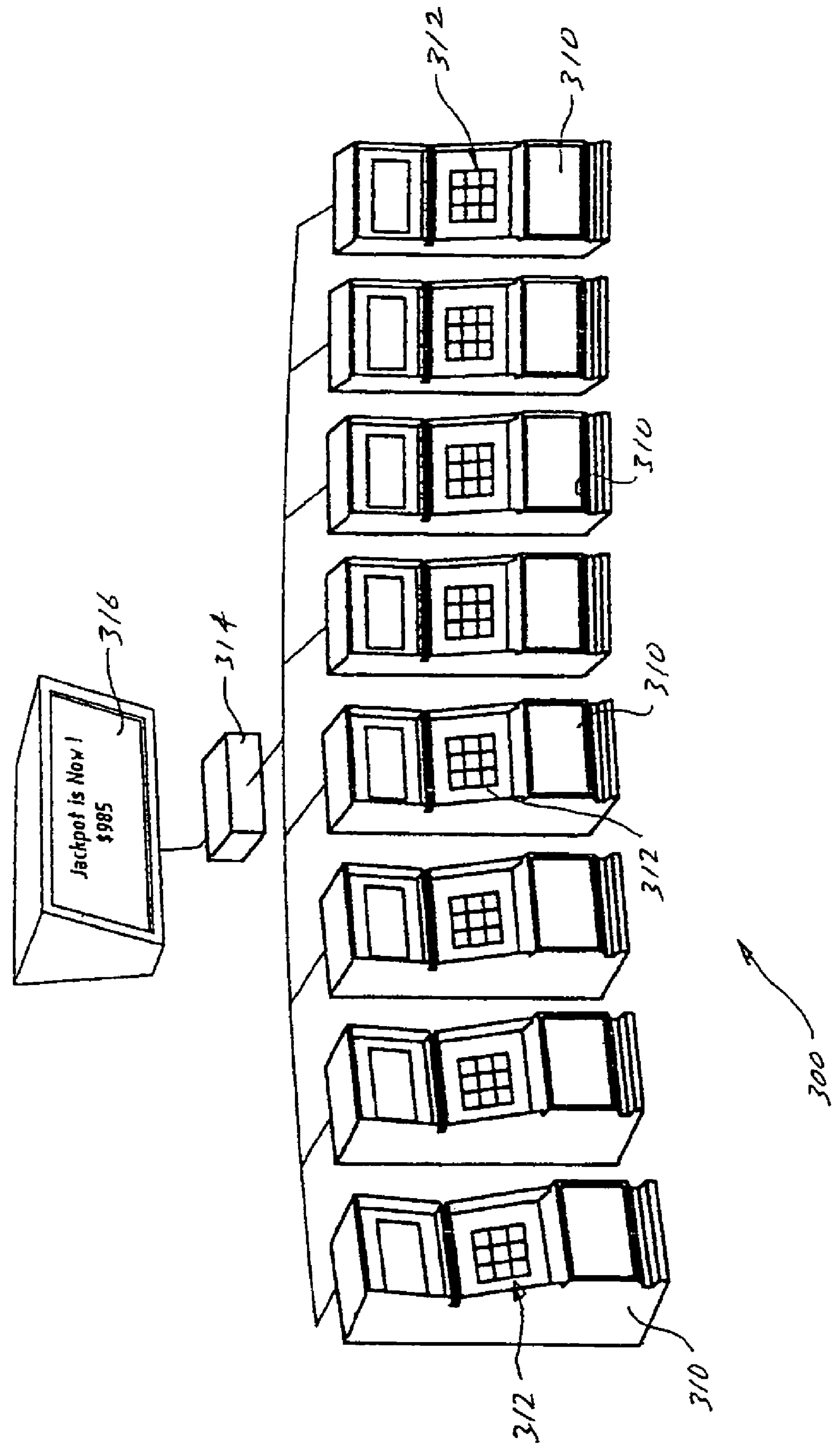
FIG. 8 illustrates a bank of dual monitor gaming machines to which a further embodiment of the present invention has been applied.

In yet a further preferred embodiment of the invention as shown in FIG. 8, a plurality of gaming machines 300 are arranged side by side in a line or arc so as to allow each of the players (not shown) of the machines to view a common jackpot prize display unit 313. Each individual machine 310 is provided with at least a main game display unit 312 for the playing of a main game in which the symbol enhancement feature is applied to selected symbols of games played on the machines.

Each of machines 310 of the embodiment illustrated in FIG. 8 is electronically linked to a jackpot control module 314 which monitors the volume of play on each of the linked machines and displays an incrementing jackpot value 316 determined according to the combined volume of play on the linked machines.

It will be appreciated that the linked machines may form part of Local Area Networks (LAN) or Wide Area Networks (WAN).

The above describes only some embodiments of the invention and modifications, obvious to those skilled in the art, can be made thereto without departing from the scope and spirit of the present invention.

What is claimed is:

1. A method implemented on an electronic gaming machine, said method enhancing video imagery of selected symbols during spinning of simulated reels of said gaming machine, said method including the steps of:

(a) a game control module selecting for enhancement a subset of symbols from symbols displayed on the simulated reels;

(b) selecting a form of a symbol enhancement feature from a data storage device of said gaming machine; and (c) associating said selected form of a symbol enhancement feature comprising a virtual semi-transparent overlay with each symbol of said subset of symbols; said enhancement feature remaining in synchronous association with said each symbol of said subset of symbols during transit of said symbols through said simulated reels; and wherein a visual effect of said virtual semi-transparent overlay is proportional to a rotational velocity of said spinning of said simulated reels, said visual effect at maximum at maximum reel spin velocity, and said visual effect disappearing as said simulated reels come to rest at a conclusion of a game sequence.

2. The method of claim 1 wherein said symbol enhancement feature comprises a semi-transparent region of a contrasting character.

3. The method of claim 2 wherein said region is centred on each of said selected symbols and extends partially over at least one adjoining symbol.

4. The method of claim 2 wherein said contrasting character is based on colour.

5. The method of claim 2 wherein said contrasting character is based on a random cycling of selected colours.

6. The method of claim 2 wherein said contrasting character is based on luminosity.

7. The method of claim 2 wherein said contrasting character is based on fluctuations of said luminosity.

8. The method of claim 2 wherein said region is of a comet-like shape; said region defining a head portion and a trailing tail portion.

9. The method of claim 8 wherein said head portion is centred on each of said selected symbols; said trailing tail portion extending substantially over at least a next following symbol of each of said selected symbols.

10. The method of claim 8 wherein said contrasting character of said head portion and said trailing tail portion is substantially identical.

11. The method of claim 8 wherein said contrasting character of said head portion and said trailing tail portion is different.

12. The method of claim 8 wherein said contrasting character of said head portion provides visually stronger enhancement than said trailing tail portion.

13. An electronic gaming machine for the playing of games of chance, said gaming machine comprising:

at least one display unit in which simulated reels are caused to spin; and a game control module configured to select a subset of symbols on said simulated reels, each symbol of said subset of symbols is provided with a semi-transparent overlay symbol enhancement feature during spinning of said simulated reels, said semi-transparent overlay symbol enhancement feature spinning synchronously with each symbol of said subset of symbols, and wherein a visual effect of said semi-transparent overlay symbol enhancement feature is proportional to a rotational velocity of said spinning of said simulated reels, said visual effect at maximum at maximum reel spin velocity, and said visual effect disappearing as said simulated reels come to rest at a conclusion of at least one of said games of chance.

14. The gaming machine of claim 13 wherein said gaming machine includes a primary and a secondary display unit.

15. The gaming machine of claim 13 wherein said gaming machine is one of an array of gaming machines interconnected with to a jackpot system.

16. The gaming machine of claim 13 wherein said gaming machine is part of a local area network of interlinked machines.

* * * * *